(12) United States Patent
Martin

(10) Patent No.: US 12,319,131 B2
(45) Date of Patent: Jun. 3, 2025

(54) TARPAULIN INCLUDING A REPLACEABLE SECTION

(71) Applicant: FABRICATION ELCARGO INC., Saint-Hyacinthe (CA)

(72) Inventor: Kendrick Martin, La Prairie (CA)

(73) Assignee: FABRICATION ELCARGO INC., Saint-Hyacinthe (CA)

( * ) Notice: Subject to any disclaimer, the term of this patent is extended or adjusted under 35 U.S.C. 154(b) by 399 days.

(21) Appl. No.: 18/001,242

(22) PCT Filed: Aug. 31, 2021

(86) PCT No.: PCT/IB2021/057958
§ 371 (c)(1),
(2) Date: Dec. 8, 2022

(87) PCT Pub. No.: WO2022/043968
PCT Pub. Date: Mar. 3, 2022

(65) Prior Publication Data
US 2023/0264546 A1    Aug. 24, 2023

Related U.S. Application Data

(60) Provisional application No. 63/123,789, filed on Dec. 10, 2020, provisional application No. 63/072,608, filed on Aug. 31, 2020.

(51) Int. Cl.
*B60J 7/10*         (2006.01)
(52) U.S. Cl.
CPC .................................... *B60J 7/102* (2013.01)
(58) Field of Classification Search
CPC .... B60P 7/04; B60J 7/102; B60J 7/104; B60J 7/185; B60J 7/198; B60J 7/061;
(Continued)

(56) References Cited

U.S. PATENT DOCUMENTS

| 473,292 A | 4/1892 | Campbell et al. |
|---|---|---|
| 1,318,820 A | 10/1919 | Watkins |

(Continued)

FOREIGN PATENT DOCUMENTS

| CN | 106915129 | 7/2017 | |
|---|---|---|---|
| CN | 106915129 A | * 7/2017 | ............. B32B 17/04 |

(Continued)

OTHER PUBLICATIONS

PCT Search report for PCT patent application PCT/IB2021/057958, from which the present patent application is a national phase, issued on Dec. 6, 2021.
PCT Written Opinion report for PCT patent application PCT/IB2021/057958, from which the present patent application is a national phase, issued on Dec. 6, 2021.
Automated translation of CN106915129A obtained on Sep. 17, 2024 through Google Patents.
European Search Report issued Sep. 3, 2024 for European patent application 21860725.7 corresponding to the present application.

*Primary Examiner* — Amy R Weisberg
*Assistant Examiner* — Veronica M Condo

(57) ABSTRACT

A tarpaulin (10) including two sections (20 and 22) linked to each other through a junction section (24). The tarpaulin (10) includes a fibrous body (30, 32 and 33) and a polymer layer (34, 36 and 37) covering or embedding at least part of the fibrous body (30, 32 and 33). The polymer layer (34, 36 and 37) is reinforced in the junction section (24) so that the latter can be cut and to remove one of the two sections (20 and 22) and to attach a replacement tarpaulin (38) to a the remaining one of the two sections (20 and 22) while protecting the fibers of the fibrous body (30, 32 and 33).

24 Claims, 5 Drawing Sheets

(58) Field of Classification Search
CPC ..... B60J 7/062; B60J 7/12; B60J 7/067; B60J 7/068; B60J 7/085; B60J 5/065
USPC ........................................ 296/100.11–100.18
See application file for complete search history.

(56) References Cited

U.S. PATENT DOCUMENTS

| | | | |
|---|---|---|---|
| 1,784,248 A | 12/1930 | Nolen et al. | |
| 1,786,048 A | 12/1930 | Williams | |
| 2,562,300 A | 7/1951 | Dingman | |
| 2,857,654 A * | 10/1958 | Sexton | B60P 7/04 |
| | | | 296/210 |
| 2,976,082 A | 3/1961 | Dahlman | |
| 2,997,967 A | 8/1961 | Malapert | |
| 3,202,454 A * | 8/1965 | Neidlinger | B60J 7/104 |
| | | | 5/99.1 |
| 3,366,414 A | 1/1968 | Gile et al. | |
| 3,384,413 A | 5/1968 | Sargent | |
| 3,423,126 A | 1/1969 | Galvin et al. | |
| 3,453,020 A | 7/1969 | Santillo, Jr. | |
| 3,768,540 A | 10/1973 | McSwain | |
| 3,785,694 A | 1/1974 | Sargent | |
| 3,819,082 A | 6/1974 | Rosenvold | |
| 3,829,154 A | 8/1974 | Becknell | |
| 3,889,321 A | 6/1975 | Moser | |
| 4,027,360 A | 6/1977 | Moser | |
| 4,212,492 A | 7/1980 | Johnsen | |
| 4,225,175 A | 9/1980 | Fredin | |
| 4,234,224 A | 11/1980 | Rosenvold | |
| 4,279,064 A | 7/1981 | Simme | |
| 4,286,007 A * | 8/1981 | Oellerking | B29C 66/305 |
| | | | 427/140 |
| 4,302,043 A | 11/1981 | Dimmer et al. | |
| 4,369,009 A | 1/1983 | Fulford | |
| 4,380,350 A | 4/1983 | Block | |
| RE31,746 E | 11/1984 | Dimmer et al. | |
| 4,484,732 A | 11/1984 | Gould | |
| 4,484,777 A | 11/1984 | Michel | |
| 4,505,512 A | 3/1985 | Schmeichel et al. | |
| 4,518,193 A | 5/1985 | Heider et al. | |
| 4,529,098 A | 7/1985 | Heider et al. | |
| 4,657,062 A | 4/1987 | Tuerk | |
| 4,659,134 A | 4/1987 | Johnson | |
| 4,673,208 A | 6/1987 | Tsukamoto | |
| 4,691,957 A | 9/1987 | Ellingson | |
| 4,700,985 A | 10/1987 | Whitehead | |
| 4,834,445 A | 5/1989 | Odegaard | |
| 4,858,984 A | 8/1989 | Weaver | |
| 4,909,563 A | 3/1990 | Walker | |
| 4,915,439 A | 4/1990 | Cramaro | |
| 1,987,942 A | 1/1991 | Eriksson | |
| 4,991,901 A | 2/1991 | Meekhof, Sr. et al. | |
| 5,002,328 A | 3/1991 | Michel | |
| 5,026,109 A | 6/1991 | Merlot, Jr. | |
| 5,050,923 A | 9/1991 | Petelka | |
| 5,086,908 A | 2/1992 | Gladish et al. | |
| 5,174,625 A | 12/1992 | Gothier et al. | |
| 5,179,991 A | 1/1993 | Haddad, Jr. | |
| 5,180,203 A | 1/1993 | Goudy | |
| 5,186,231 A | 2/1993 | Lewis | |
| 5,211,440 A | 5/1993 | Cramaro | |
| 5,240,303 A | 8/1993 | Hageman | |
| 5,253,914 A | 10/1993 | Biancale | |
| 5,328,228 A | 7/1994 | Klassen | |
| 5,429,403 A | 7/1995 | Brasher | |
| 5,466,030 A | 11/1995 | Harris et al. | |
| 5,498,057 A * | 3/1996 | Reina | B60J 5/067 |
| | | | 160/84.01 |
| 5,540,475 A | 7/1996 | Kersting et al. | |
| 5,542,734 A | 8/1996 | Burchett et al. | |
| 5,549,347 A | 8/1996 | Anderson | |
| 5,658,037 A | 8/1997 | Evans et al. | |
| 5,690,377 A | 11/1997 | Denyer | |
| 5,692,793 A | 12/1997 | Wilson | |
| 5,697,663 A | 12/1997 | Chenowth | |
| 5,713,712 A * | 2/1998 | McIntyre | B65D 88/125 |
| | | | 414/572 |
| 5,762,002 A | 6/1998 | Dahlin et al. | |
| 5,765,901 A | 6/1998 | Wilkens | |
| 5,794,528 A | 8/1998 | Gronig et al. | |
| 5,823,067 A | 10/1998 | Clarys et al. | |
| 5,911,467 A | 6/1999 | Evans et al. | |
| 5,924,758 A | 7/1999 | Dimmer et al. | |
| 5,938,270 A | 8/1999 | Swanson et al. | |
| 5,984,379 A | 11/1999 | Michel et al. | |
| 6,007,138 A | 12/1999 | Cramaro | |
| 6,135,534 A | 10/2000 | Schmeichel | |
| 6,142,553 A | 11/2000 | Bodecker | |
| 6,142,554 A | 11/2000 | Carroll et al. | |
| 6,152,516 A | 11/2000 | Williams | |
| 6,193,299 B1 | 2/2001 | Than | |
| 6,199,935 B1 | 3/2001 | Waltz et al. | |
| 6,206,449 B1 | 3/2001 | Searfoss | |
| 6,234,562 B1 | 5/2001 | Henning | |
| 6,302,469 B1 * | 10/2001 | Jones | B60J 7/102 |
| | | | 296/100.16 |
| 6,318,790 B1 * | 11/2001 | Henning | F16F 1/10 |
| | | | 267/272 |
| 6,322,041 B1 | 11/2001 | Schmeichel | |
| 6,361,100 B1 | 3/2002 | Koester | |
| 6,435,595 B1 | 8/2002 | Chenowth | |
| 6,435,599 B2 | 8/2002 | Than | |
| 6,478,361 B1 | 11/2002 | Wood | |
| 6,513,856 B1 | 2/2003 | Swanson et al. | |
| 6,527,331 B2 | 3/2003 | Searfoss | |
| 6,595,594 B2 * | 7/2003 | Royer | B60J 7/085 |
| | | | 296/98 |
| 6,655,726 B2 | 12/2003 | Bergeron | |
| 6,715,817 B2 | 4/2004 | Nolan et al. | |
| 6,779,828 B1 | 8/2004 | Poyntz | |
| 6,783,168 B2 | 8/2004 | Searfoss | |
| 6,805,395 B2 | 10/2004 | Royer | |
| 6,886,879 B2 | 5/2005 | Nolan et al. | |
| 6,905,161 B2 | 6/2005 | Fliege et al. | |
| 6,926,337 B2 | 9/2005 | Poyntz | |
| 7,189,042 B1 | 3/2007 | Schmit | |
| 7,210,726 B2 * | 5/2007 | Merlot, Jr. | B60J 7/065 |
| | | | 296/100.11 |
| 7,506,912 B2 | 3/2009 | Royer | |
| 7,513,561 B2 | 4/2009 | Royer | |
| 7,549,695 B2 | 6/2009 | Royer | |
| 8,177,284 B1 | 5/2012 | Royer | |
| 8,641,123 B1 * | 2/2014 | Royer | B60J 7/085 |
| | | | 296/100.11 |
| 8,998,287 B2 | 4/2015 | Smith et al. | |
| 11,820,276 B2 * | 11/2023 | Farmer | A01M 13/003 |
| 2002/0021018 A1 | 2/2002 | Royer | |
| 2002/0043816 A1 | 4/2002 | Johnston | |
| 2002/0109371 A1 | 8/2002 | Wheatley | |
| 2002/0135199 A1 | 9/2002 | Hanning | |
| 2003/0052506 A1 | 3/2003 | Royer | |
| 2003/0090124 A1 | 5/2003 | Nolan | |
| 2003/0190209 A1 | 8/2003 | Smith | |
| 2004/0195858 A1 | 10/2004 | Martin | |
| 2008/0217952 A1 | 9/2008 | Royer | |
| 2010/0230994 A1 | 9/2010 | Royer | |
| 2010/0320798 A1 | 12/2010 | Huotari et al. | |
| 2011/0084514 A1 * | 4/2011 | Leblanc | B60J 7/062 |
| | | | 296/100.12 |
| 2011/0254310 A1 | 10/2011 | Royer | |
| 2016/0332557 A1 | 11/2016 | Royer | |

FOREIGN PATENT DOCUMENTS

| | | | | |
|---|---|---|---|---|
| EP | 2535217 A2 * | 12/2012 | | B60J 7/06 |
| EP | 2535217 | 5/2015 | | |
| GB | 762177 A * | 11/1956 | | |

* cited by examiner

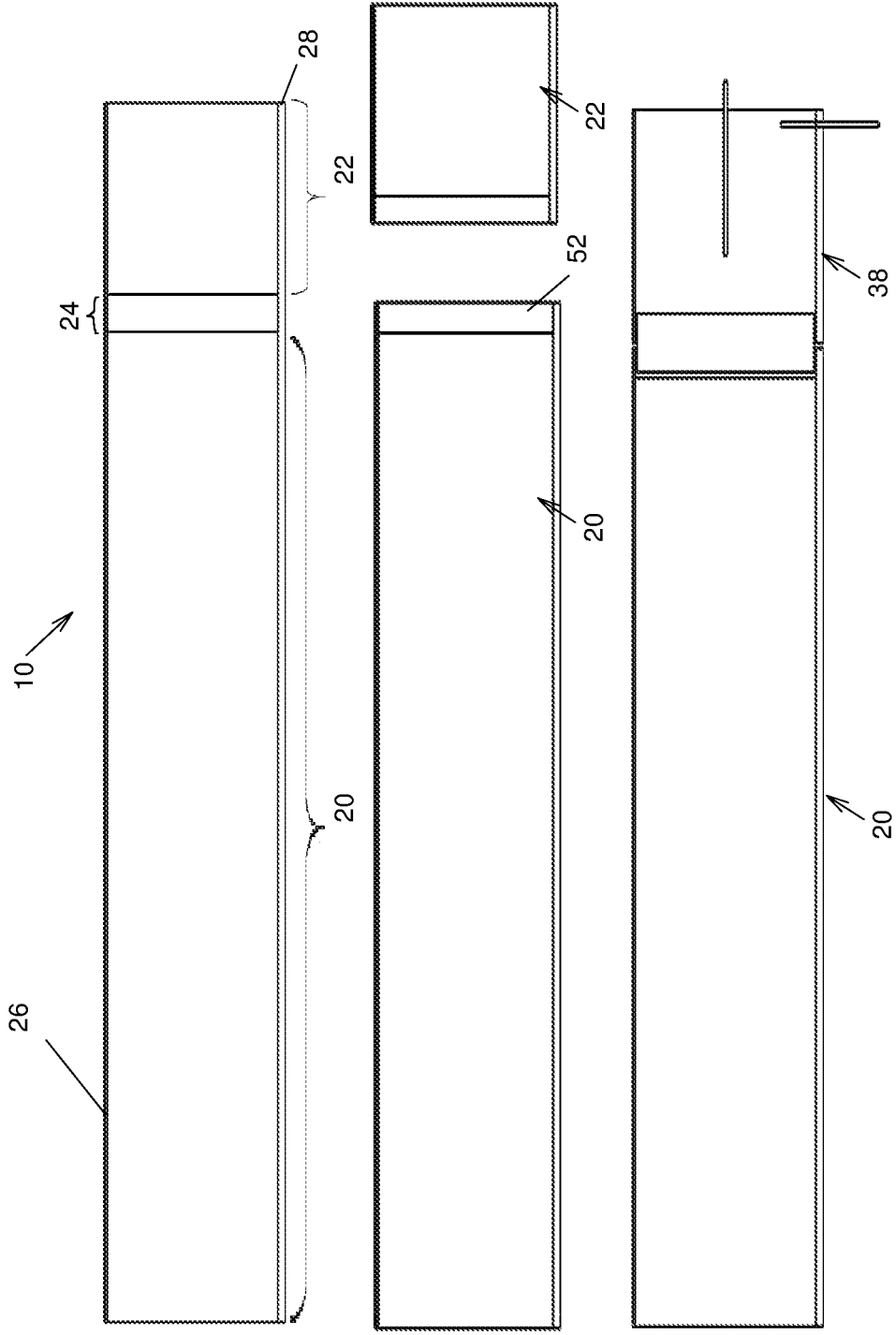

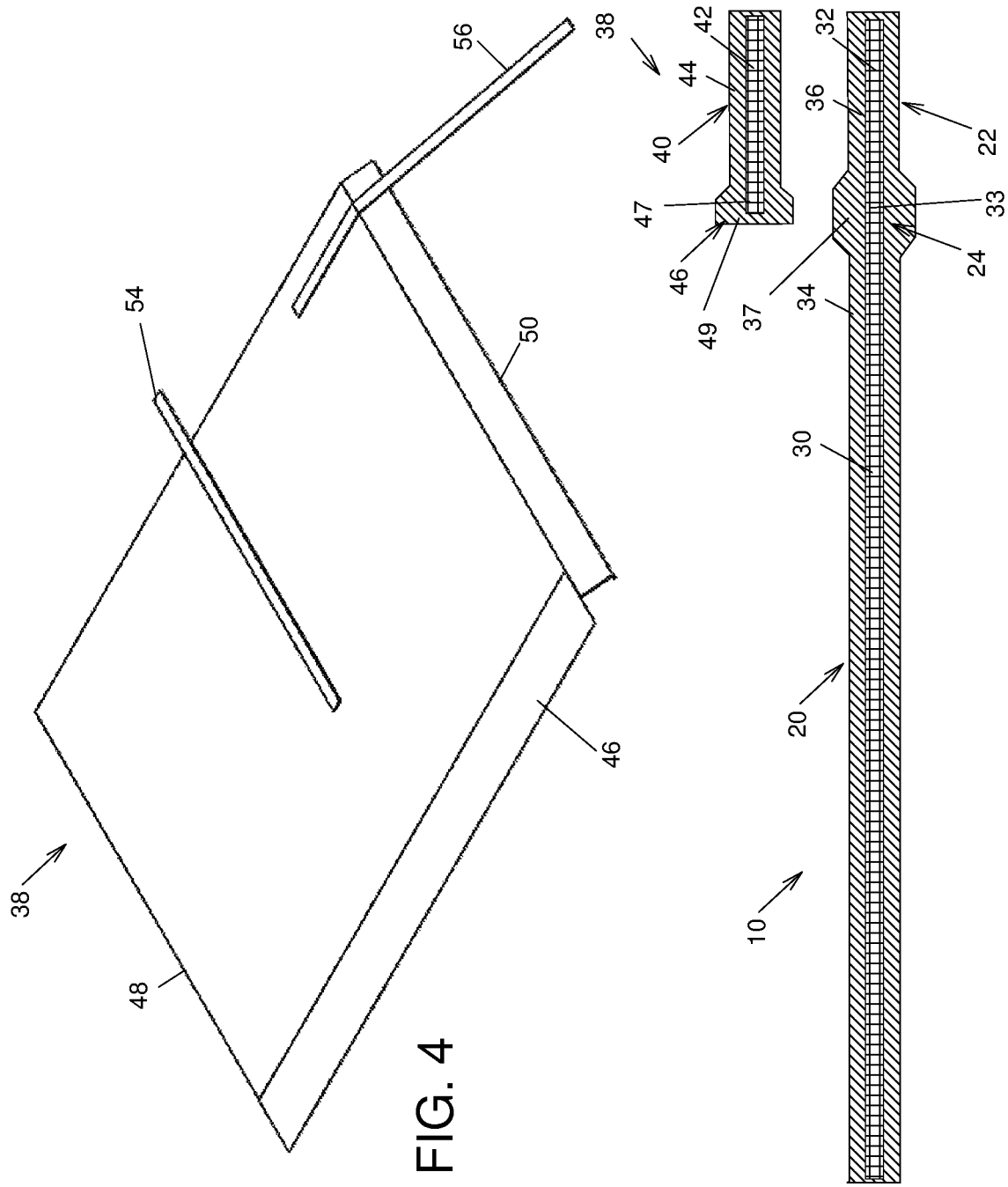

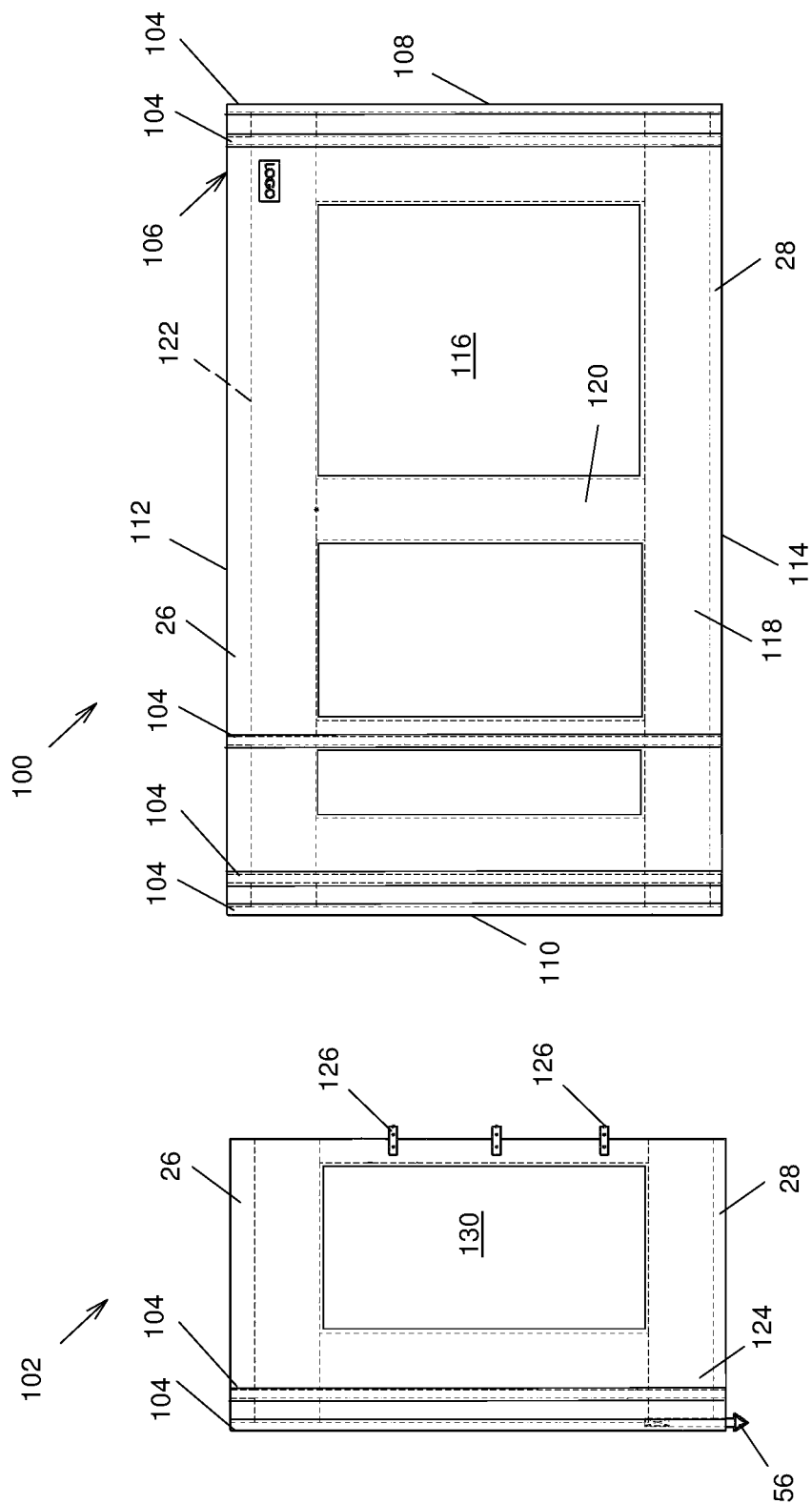

TARPAULIN INCLUDING A REPLACEABLE SECTION

FIELD OF THE INVENTION

The present invention relates generally to the field of transportation, and, more particularly, to a tarpaulin including a replaceable section that can be removed when damaged and replaced with an intact one.

BACKGROUND

Tarpaulins used to cover loads carried by trucks, semi-trailers and trains often have a composite composition, with a fibrous material, such as a scrim, a woven material or mesh, encased, for example through lamination or impregnation, in a continuous, bulk, polymer. The fibrous material provides resistance to tension while the continuous polymer provides a solid continuous barrier. Other such tarpaulins are mainly composed of a polymeric or mixed polymeric/metallic mesh, usually provided with reinforcements along their periphery and in selected longitudinally spaced apart from each other bands between their front and rear ends.

Such tarpaulins often become frayed at the edge due to fluttering while a vehicle carries a load over which the tarpaulin is extended, especially at high speed. Also, they can be punctured, torn or otherwise damaged, often by the contents of the load being covered. Once damage has begun, stress concentrations at the junction of edges in a cut or in a frayed portion creates further damage, and the tarpaulin has to eventually be replaced. One could in theory repair the tarpaulin by simply cutting the damaged portion and securing a replacement patch to the remaining portion of the tarpaulin. However, such a repair process would create additional weaknesses by exposing the fibrous material at the edge of a cut made to remove the damaged portion. Thus, quick repairs while maintaining the tarpaulin installed are unlikely to be successful. Due to the high labor cost of removing the tarpaulin and reinstalling it, in addition to the complex process required to properly join two tarpaulin sections without reducing damage resistance of the tarpaulin, tarpaulins are usually replaced when damaged, even if most of the tarpaulin is still intact.

Against this background, there exists a need for an improved tarpaulin repair method. An object of the present invention is to provide such a method and associated devices.

SUMMARY OF THE INVENTION

In a broad aspect, there is provided a tarpaulin system for a vehicle, comprising: a main tarpaulin mountable to the vehicle, the main tarpaulin including first and second sections spaced apart from each other and a junction section extending therebetween, wherein the first and second sections include respectively first and second fibrous bodies, the first and second fibrous bodies being at least in part covered by or embedded in respectively first and second polymer layers, the main tarpaulin defining a tarpaulin peripheral edge including longitudinally opposed tarpaulin first and second end edges and laterally opposed tarpaulin side edges extending therebetween; and a replacement tarpaulin including a replacement section configured for replacing one of the first and second sections, the replacement section including a replacement fibrous body, the replacement fibrous body being at least in part covered by or embedded in a replacement polymer layer, the replacement tarpaulin also including an attachment section extending from the replacement section. The junction section is cuttable to separate the first and second end sections from each other while maintaining integrity of the first and second fibrous bodies so that the main tarpaulin is restored after the one of the first and second end sections is removed and replaced by the replacement section with a remaining portion of the junction section and the attachment section joined to each other.

The junction section is configured so that the fibers of the fibrous bodies of main tarpaulin are protected from fraying even after the junction section has been cut. This can be performed for example by having a relatively thick polymer covering or embedding the fibrous bodies in the junction section. This can also be performed by sewing a reinforcement in the junction section that will prevent these fibres from fraying beyond this reinforcement.

There may also be provided a tarpaulin system wherein the junction section includes a junction fibrous body.

There may also be provided a tarpaulin system wherein the first, second and junction fibrous bodies extend integrally as a single piece of material from each other.

There may also be provided a tarpaulin system wherein the attachment section includes an attachment fibrous body, the attachment and replacement fibrous bodies extending integrally as a single piece of material from each other.

There may also be provided a tarpaulin system wherein the first and second polymer layers cover or embed substantially entirely the first and second fibrous bodies, the junction fibrous body being substantially entirely covered by or embedded in a junction polymer layer.

There may also be provided a tarpaulin system wherein the first, second and junction polymer layers extend integrally from each other as a single piece of material.

There may also be provided a tarpaulin system wherein the junction polymer is thicker than the first and second polymer layers.

There may also be provided a tarpaulin system wherein the first and second polymer layers have substantially similar thicknesses, the junction polymer layer being at least twice as thick as the first and second polymer layers.

There may also be provided a tarpaulin system wherein the first, second and junction fibrous bodies include at least one of a scrim, a woven material, a fabric or a mesh, nylon, polyester, a metallic material and a polymeric material and wherein the first, second and junction polymer layers are made of polyvinyl chloride (PVC).

There may also be provided a tarpaulin system wherein the attachment fibrous body is substantially entirely covered by or embedded in an attachment polymer layer, the attachment and junction polymer layers having substantially similar thicknesses.

There may also be provided a tarpaulin system wherein the junction section includes a junction fibrous body, the first, second and junction fibrous bodies extend integrally as a single piece of material from each other, the junction fibrous body being secured to a junction woven reinforcement belt extending therealong between the tarpaulin side edges; and the attachment section includes attachment straps protruding from a remainder of the replacement tarpaulin. The main tarpaulin is cuttable along the junction woven reinforcement belt to remove a damaged portion of the tarpaulin and replace the damaged section by the replacement section by securing the attachment straps and junction woven reinforcement belt to each other.

There may also be provided a tarpaulin system wherein the first and second polymer layers include lateral reinforcement bands extending laterally across the tarpaulin, at least one of the lateral reinforcement bands extending in register with the junction woven reinforcement belt; and the replacement section includes a replacement mesh reinforced with sewn polymer bands around a replacement peripheral edge thereof.

There may also be provided a tarpaulin system wherein the first, second and junction fibrous bodies are made of a tarpaulin mesh.

There may also be provided a tarpaulin system wherein the tarpaulin mesh is reinforced with sewn polymer bands around the tarpaulin peripheral edge.

There may also be provided a tarpaulin system further comprising a mounting system for mounting the main tarpaulin to a tarpaulin handling system usable to deploy and retract the tarpaulin relative to the vehicle.

There may also be provided a tarpaulin system wherein the mounting system includes an elongated member thicker than the main tarpaulin and an open-ended pocket each extending along a respective one of the tarpaulin side edges.

There may also be provided a tarpaulin system wherein the replacement tarpaulin includes a replacement mounting system for mounting the replacement tarpaulin to the tarpaulin handling system.

There may also be provided a tarpaulin system further comprising a cinch extending from the main tarpaulin adjacent to or at one of the tarpaulin first and second end edges for securing to the vehicle.

There may also be provided a tarpaulin system further comprising protective pads made of a material softer than metal and mountable to the vehicle so that the protective pads are between the main tarpaulin and the vehicle when the tarpaulin is deployed to reduce wear of the main tarpaulin adjacent at least one of the tarpaulin first and second end edges when the main tarpaulin moves relative to the vehicle while the latter moves.

In yet another broad aspect, there is provided a method for repairing a main tarpaulin using a replacement tarpaulin, the main tarpaulin being mounted to a tarpaulin handling system usable to deploy and retract the main tarpaulin relative to a vehicle, the main tarpaulin including a fibrous core, the method comprising: deploying the main tarpaulin using the tarpaulin handling system; with the main tarpaulin remaining mounted to the tarpaulin handling system, cutting the main tarpaulin thereacross in a junction section provided between damaged and remaining sections of the main tarpaulin to separate the damaged and remaining sections from each other; removing the damaged section from the tarpaulin handling system while keeping the remaining section mounted to the tarpaulin handling system; mounting the replacement tarpaulin to the tarpaulin handling system and positioning the replacement tarpaulin adjacent to or overlapping with part of the remaining section; and securing the replacement and remaining sections to each other. The method may used with any of the tarpaulin systems mentioned in the present document or in the claims.

There may also be provided a method wherein the fibrous core is embedded in a polymer layer, the polymer layer being thicker in the junction section than in a remainder of the main tarpaulin.

There may also be provided a method wherein the fibrous core is reinforced with polymer bands extending across the tarpaulin, the main tarpaulin further comprising a woven reinforcement belt extending along one of the polymer bands in the junction section.

There may also be provided a method wherein cutting the main tarpaulin includes cutting the reinforcement belt.

There may also be provided a method wherein cutting the main tarpaulin includes cutting the main tarpaulin adjacent the reinforcement belt.

There may also be provided a method wherein the replacement tarpaulin is provided with attachment straps protruding therefrom, securing the replacement and remaining sections to each other including securing the attachment straps to the remaining section in the junction section.

There may also be provided a method wherein securing the replacement and remaining sections to each other includes at least one of gluing, ultrasound welding, stitching, riveting or bolting the replacement and remaining sections to each other.

In yet another broad aspect, there is provided a repaired tarpaulin obtained from a main tarpaulin and a replacement tarpaulin by performing the method as defined above and throughout the present document.

In yet another broad aspect, there is provided a tarpaulin system, comprising: a main tarpaulin including first and second end sections and a junction section extending therebetween, wherein the main tarpaulin is made of a composite material including a fibrous core covered or embedded in a polymer layer, the polymer layer being thicker in the junction section than in the first and second end sections; and a replacement tarpaulin configured for replacing one of the first and second end sections, the replacement tarpaulin including a replacement fibrous core covered or embedded in a replacement polymer layer, the replacement section including a tarp section and an attachment section extending therefrom, the replacement polymer layer being thicker in the attachment section than in the tarp section. The junction section is cuttable to separate the first and second end sections from each other so that one of the first and second end sections may be replaced by the replacement section by joining a remaining portion of the junction section and the attachment section to each other.

In yet another broad aspect, there is provided a main tarpaulin defining a tarpaulin peripheral edge including longitudinally opposed tarpaulin first and second end edges and laterally opposed tarpaulin side edges extending therebetween, the main tarpaulin including a tarpaulin mesh reinforced with sewn polymer bands around the tarpaulin peripheral edge with one of more lateral reinforcement band extending laterally thereacross and provided between the tarpaulin first and second end edges, a reinforcement belt extending laterally between the tarpaulin first and second side edges in at least one of the lateral reinforcement bands; and a replacement tarpaulin configured for replacing part of the main tarpaulin, the replacement tarpaulin including a replacement mesh reinforced with sewn polymer bands around a replacement peripheral edge thereof. The main tarpaulin is cuttable along one of the reinforcement belts to remove a damaged portion of the main tarpaulin and replace the damaged section by the replacement tarpaulin by securing the one of the reinforcement belts and the replacement tarpaulin edge to each other.

Advantageously, the fibrous bodies or cores that will be part of the tarpaulin after repair are protected, and therefore weaknesses are not introduced therein by the repair process. Also, in some embodiments, tarpaulin repair may occur while the tarpaulin remains mounted to a tarpaulin handling system used to manipulate the tarpaulin to cover and uncover a load carried by a vehicle, which greatly increases the speed with which repair can be performed compared to an alternative in which the tarpaulin has to be removed to perform a repair.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 1, in top plan view, illustrates a tarpaulin;

FIG. 2, top plan view, illustrates the tarpaulin of FIG. 1 from which an end section has been removed to leave a remaining section adjacent to a section to be replaced by a replacement tarpaulin, shown in FIG. 3;

FIG. 3, in a top plan view, illustrates the remaining section and replacement tarpaulin secured to each other;

FIG. 4, in a perspective view, illustrates the replacement tarpaulin of FIG. 2;

FIG. 7, in a schematic cross-sectional view, illustrates the tarpaulin of FIG. 2 and the replacement section of FIG. 4;

FIG. 8, in a top elevation view, illustrates an alternative tarpaulin including a replaceable section;

FIG. 9, in a top elevation view, illustrates a replacement tarpaulin usable with the tarpaulin of FIG. 8.

DETAILED DESCRIPTION

Figure 6:
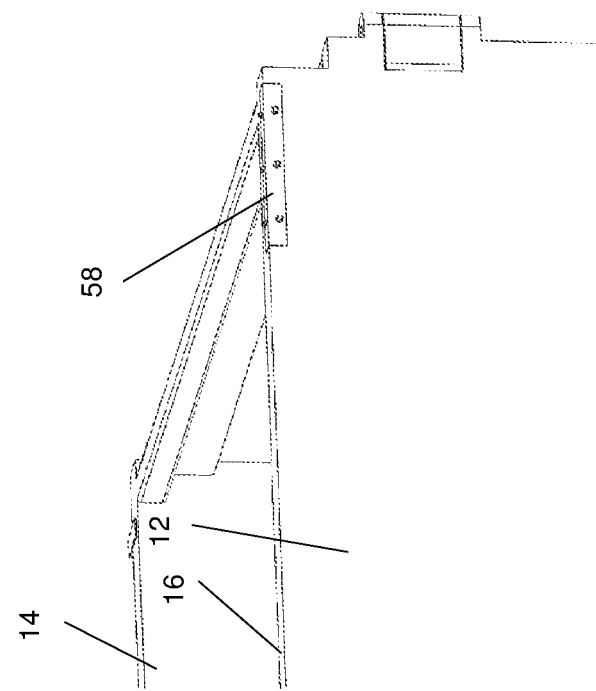
FIG. 6, in a perspective view, illustrates wear pads usable with the replacement section of FIG. 4.
Figure 5:
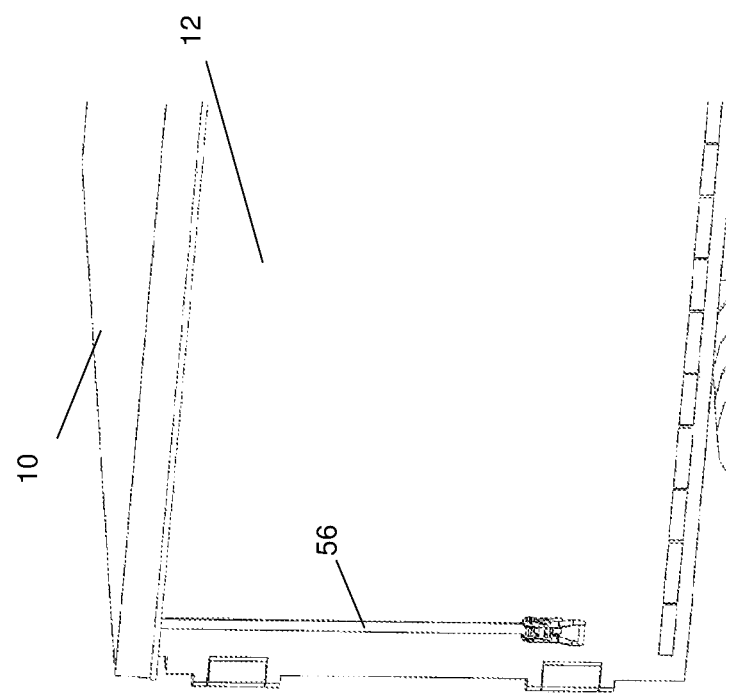
FIG. 5, in a perspective view, illustrates the replacement section of FIG. 4 extending across a cargo containing container of a vehicle.
Figure 10:
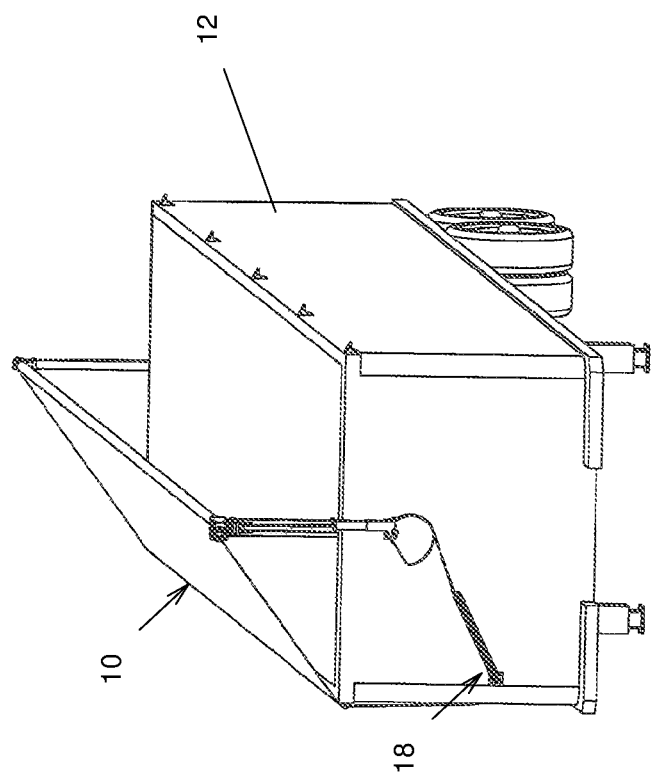
FIG. 10, in a perspective view, illustrates a tarpaulin handling system usable with the tarpaulin systems described in this document.

The present invention relates to the repair of tarpaulins 10 used to cover the cargo of vehicles. For example, referring to FIGS. 5, 6 and 10 collectively, the cargo is carried in a container 12, such as the box of a dump truck, an open top semi-trailer or an open top train cargo wagon, defining a top aperture 14 delimited by an aperture peripheral edge 16. The tarpaulin 10 is typically manipulated by a tarpaulin handling system 18 (seen in FIG. 10). All the elements described so far may be conventional, except for the tarpaulin 10, which is conceived to facilitate repair thereof. For example, the tarpaulin handling system 18 may be of the type including or two pivotable arms at the end of which a rod around which the tarpaulin 10 may be rolled is provided. When the arms move across the top aperture 14, the tarpaulin 10 may be rolled around the rod or unrolled therefrom. The other edge of the tarpaulin 10, opposed to the arm, is typically fixed relative to the vehicle 12. A non-limiting example of such a tarpaulin handling system is described in U.S. Pat. No. 9,561,747 issued Feb. 7, 2017, the contents of which is hereby incorporated by reference in its entirety.

The tarpaulin 10 includes first and second sections that are joined to each other through a junction section. The junction section is engineered to be cuttable while maintaining physical integrity of the tarpaulin 10 so that a replacement tarpaulin can be attached thereto after cutting to restore the tarpaulin 10. In one embodiment of the invention, as seen in FIG. 1, the tarpaulin 10 includes first and second end sections 20 and 22 and a junction section 24 extending therebetween. In some embodiments, the first and second end sections 20 and 22 are longitudinally opposed to each other and the first end, second end and junction sections 20, 22 and 24 extend along the whole width of the tarpaulin 10, or extend along most of the width of the tarpaulin 10 between laterally opposed first and second mounts 26 and 28. The first and second mounts 26 and 28 form a mounting system and are used to mount the tarpaulin 10 to the tarpaulin handling system 18 and are further described below.

While longitudinally spaced apart first and second end sections 20 and 22 are shown in this specific embodiment, in alternative embodiments the first and second sections have any other suitable configuration. For example, and non-limitingly, the first and second end section may be laterally opposed to each other. Also, the tarpaulin 10 may include more than two sections separated from each other by junction sections. In yet another embodiment, the tarpaulin is divided into a grid of replaceable sections with junction sections provided between the replaceable sections.

The first end, second end and junction sections 20, 22 and 24 are composite in that they include two different materials secured to each other. Referring to FIG. 7, the first and second end sections 20 and 22 include respectively first and second fibrous bodies 30 and 32 covered or embedded in respectively first and second polymer layers 34 and 36. Similarly, the junction section 24 includes a junction fibrous body 33 covered or embedded in a junction polymer layers 37. In the embodiment shown in FIG. 7, the entire first, second and junction fibrous bodies 30, 32 and 33 are embedded or covered by the first, second and junction polymer layers 34, 36 and 37. However, in alternative embodiments, some portions of one or more of the first, second and junction fibrous bodies 30, 32 and 33 are exposed and not covered by the first, second and junction polymer layers 34, 36 and 37.

In a specific non-limiting example, the first and second fibrous bodies 30 and 32 and the junction fibrous body 33 are made of a scrim, a woven material, a fabric or a mesh, either metallic, polymeric or combining polymers and metals. The first, second and junction polymer layers 34, 36 and 37 are made of a bulk material continuously extending over the whole volume of the first end, second end and junction sections 20, 22 and 24, except for the volume occupied by the fibers of the first, second and junction fibrous bodies 30, 32 and 33. Typically, the first, second and junction polymer layers 34, 36 and 37 extend integrally as a single piece of material from each other and the first, second and junction fibrous bodies 30, 32 and 33 also extend integrally as a single piece of material from each other. This creates a tarpaulin 10 that has no weaknesses that could be introduced by discontinuities in the materials from which it is made. The thicker junction polymer layer 37 protects the fibers of the junction fibrous body 33 when the junction section 24 is cut to repair the tarpaulin 10.

In a specific embodiment of the invention, the first, second and junction fibrous cores 30, 32 and 33 are made of polyester or nylon and the first, second and junction polymer layers 34, 36 and 37 are made of polyvinyl chloride (PVC). The junction section 24, is thicker than the first and second end sections 20 and 22, typically due to a thicker junction polymer layer 37. Transition to this larger thickness may be relatively gradual, or abrupt. It should be noted that in FIG. 7, this relative thickness of the tarpaulin 10 compared to its length has been exaggerated to better show these thickness variations. For example, the junction section 24 is about at least twice as thick as the first and second end sections 20 and 22, the two latter having similar thicknesses, but other relative thicknesses are within the scope of the invention. It should be noted that simply using a very thick polymer layer along the whole tarpaulin 10 would result in a very bulky and heavy tarpaulin 10 that would require a very sturdy tarpaulin handling system 18. Also, this would require a lot of material to be used when manufacturing the tarpaulin 10. Therefore, the tarpaulin 10 and tarpaulin handling system 18 would become relatively expensive. Cargo transport is a very competitive business and such an increase in cost would be unacceptable.

FIGS. 3 and 7 show a replacement tarpaulin 38. The replacement tarpaulin 38 is configured for replacing one of the first and second end sections 20 and 22. As seen in FIG. 7, the replacement tarpaulin 38 includes a replacement section 40 made of the composite material and including a replacement fibrous body 42 covered or embedded, in whole or in part, in a replacement polymer layer 44. The replacement fibrous body and polymer layer 42 and 44 are similar to the first or second fibrous body 30 or 32 and first or second polymer layer 34 or 36. The replacement section 38 also includes an attachment section 46 made of a homogeneous polymer layer 49 embedding or covering an attachment fibrous body 47. Similarly to the tarpaulin 10, the replacement tarpaulin 38 includes attachment and replacement fibrous bodies 42 and 47 extending integrally from each other as a single piece of material and attachment and replacement polymer layers 44 and 49 extending integrally from each other as a single piece of material. In that respect, the attachment section 46 is similar to the junction section 24. The replacement section 38 is manufactured similarly to the tarpaulin 10, but by omitting one of the first and second end sections 20 and 22, and in some embodiments, half of the junction section 24.

In some embodiments, the first and second mounts 26 and 28 are provided along the whole tarpaulin 10 or along part of the tarpaulin 10. For example, the first and second mounts 26 and 28 extend laterally opposed to each other along the whole length of the first end, second end and junction sections 20, 22 and 24. The first and second mounts 26 and 28 are configured to allow separation of the first and second end sections 20 and 22 from each other when the junction section 24 is cut, as further described below. To that effect, the first and second mounts 26 and 28 may be interrupted in the junction section 24, or may be made of a material that is cuttable relatively easily when the junction section 24 is cut. The first and second mounts 26 and 28 are typically configured so that after repair with the replacement section 38, the first and second mounts 26 and 28 will remain strong enough to properly mount the tarpaulin 10. The replacement section 38 typically also includes similar replacement first and second mounts 48 and 50. In embodiments in which the replacement section 38 does not overlap a remaining portion 52 when the replacement section 38 is mounted to the tarpaulin handling system 18, the replacement first and second mounts 48 and 50 may extend along the whole length of the replacement section 38. However, if an overlap is desired, the replacement first and second mounts 48 and 50 may terminate short of the end of the replacement section 38 so that the replacement first and second mounts 48 and 50 are adjacent to the first and second mounts 26 and 28 respectively with no overlap therewith when the replacement section 38 is secured to the remaining section 52.

The first and second mounts 26 and 28 are used to mount the tarpaulin 10 to the tarpaulin handling system 18. In embodiments in which the tarpaulin handling system 18 is able to handle the tarpaulin without the first and second mounts 26 and 28, the first and second mounts 26 and 28 may be omitted. In a very specific embodiment of the invention, the first mount 26 is an elongated member thicker than the first and second end sections 20 and 22, for example commercialized as a Keder™ and the second mount 28 is a pocket open at both ends and defining a passageway extending longitudinally along the tarpaulin 10. In this embodiment, the elongated member in insertable through a central passageway of a conventional hollow tube defining a longitudinal slit through which the tarpaulin 10 may extend and the pocket may receive a conventional metal rod thereinto. The hollow tube is used to roll the tarpaulin 10 therearound to stow the tarpaulin 10 and the metal rod is used to apply tension in the tarpaulin 10.

The junction section 24 is cuttable to separate the first and second end sections 20 and 22 from each other so that one of the first and second end sections 20 or 22 may be replaced by the replacement section 38 by joining a remaining portion 52 of the junction section 24, seen in FIG. 2, and the attachment section 46 to each other while keeping the first or second fibrous cores 30 or 32 and the replacement fibrous core 42 intact after repair. Such junction can be performed in any suitable manner, for example using an adhesive, ultrasound welding, rivets, bolts or stitches, among other possibilities. The replacement section 38 and remaining portion 52 of the junction section 24 may be positioned side-by side or superposed on top of each other, depending on the junction method used. In some embodiments, the junction is simply performed by positioning the replacement section 38 and remaining portion 52 adjacent to each other, without securing them to each other. In some embodiments, the whole replacement process can be performed with the tarpaulin 10 remaining mounted to the tarpaulin handling system 18, as the first and second mounts 26 and 28 in the removed section of the tarpaulin 10 are simply moved longitudinally along the tube and rod to which they are mounted. The replacement section 38 can similarly be slid onto these rod and tube. However, if desired, the tarpaulin 10 can also be removed from the tarpaulin handling system 18 and remounted thereto after the replacement process is completed.

The proposed tarpaulin 10 typically includes a junction section 24 that extends along the direction along which the tarpaulin is under tension by the tarpaulin handling system, so that the tensile properties of the tarpaulin 10 are almost unaffected by the presence of the junction section 24. However, replacement sections that are perpendicular to this tension direction are also possible. The junction section 24 is typically relatively small in the direction joining the first and second end sections 20 and 22, for example between about 12 and 18 inches, although other dimensions are possible. Also, tarpaulins 10 including many junction sections 24 at various longitudinal locations therealong are within the scope of the invention. In some embodiments, the second end section 22 is about 3 to 6 feet long and provided at the back of the tarpaulin 10 relative to a direction of motion of the container 12, that is typically at the back of a truck or semitrailer, as it is this back section that is typically damaged in tarpaulins 10 due to fluttering.

To reduce damages after replacement, the second end section 22 and the replacement section 38 may be provided with one or more reinforcement members 54, for example elongated sheets of metal or any other any elongated member made of a suitable material inserted in pockets provided therein and extending longitudinally along part thereof from a free end of the tarpaulin 10. Also, a cinch 56 may be provided extending from the replacement section 38 opposed to the location around which the tarpaulin 10 is rolled to apply further tension to the tarpaulin 10 when the latter is extended. Additional cinches may also extend at other longitudinal locations along the tarpaulin 10. The cinch 56 is for example adjacent the rear end of the tarpaulin 10 and attachable to the container 12 in any suitable manner.

Finally, protective pads 58 made of a suitable material may cover edges in the container 12 at the rear thereof at some locations where the tarpaulin abuts against the container 12 when the tarpaulin covers a load under tension. These protective pads 58 are made of a material softer than metal and mountable to the vehicle so that the protective pads are between the tarpaulin 10 and the vehicle when the tarpaulin is deployed to reduce wear of the tarpaulin 10 adjacent at least one of its ends when the tarpaulin moves relative to the vehicle while the latter moves. For example, the protective pads 58 are riveted to the container 12 and made of vinyl or of a fibrous material that protected the tarpaulin 10 when the latter rubs against the container 10, for example due to fluttering or other movements. The protective pads 58 dull the typically relatively sharp metal edges on which the tarpaulin 10 may rub.

In use, the tarpaulin 10 may be repaired when a section thereof is damaged by cutting the tarpaulin 10 across the whole junction section 24 so that one of the tarpaulin first and second end sections 20 or 22 can be replaced. The one of the tarpaulin first and second end sections 20 or 22 that is removed is typically a damaged section, and the other one is a remaining section, that will be used after repair. Then, the damaged section is removed and the replacement tarpaulin 38 is positioned adjacent to or overlapping with the remaining section, depending on the method that will be used to join the replacement tarpaulin 38 and the remaining section. Finally, the replacement tarpaulin 38 and the remaining section are secured to each other.

In some embodiments, the whole process is performed without removing the remaining section from the tarpaulin handling system 18. In such embodiments, the tarpaulin 10 is already mounted to the tarpaulin handling system 18 and deployed. Then, the cut is performed and the damaged section is removed without removing the remaining section from the tarpaulin handling system, followed by mounting of the replacement tarpaulin 38 to the tarpaulin handling system and joining of the replacement tarpaulin 38 with the remaining section.

FIGS. 8 and 9 together illustrate another tarpaulin system including a tarpaulin 100 and a replacement tarpaulin 102. The tarpaulin 100 and the replacement tarpaulin 102 are usable similarly to the tarpaulin 10 and replacement tarpaulin 38. However, the tarpaulin 100 and the replacement tarpaulin 102 differ therefrom by the fact that they are mesh based. The mesh forms a fibrous body, and is only partially covered by polymer layers. Repair of mesh tarpaulin is particularly difficult as there is no easy way to attach securely two meshes to each other so that they will be able to withstand the forces exerted thereon while the tarpaulin is in use. Also, any cut in the mesh will expose free fiber ends and will result in an easily damaged structure. The proposed tarpaulin 100 allows repairs by being provided with one or more reinforcement belts 104 at which the tarpaulin 100 can be cut to remove a damaged section and to which the replacement section 102 may be secured. The reinforcement belts 104 are typically made of a sturdy material, such as woven material, for example woven polyester of the type used in vehicle seat belts, and may be impregnated with a binder to ensure that the fibers thereof are well protected.

More specifically, as seen in FIG. 8, the tarpaulin 100 defines a tarpaulin peripheral edge 106 including longitudinally opposed tarpaulin first and second end edges 108 and 110 and laterally opposed tarpaulin side edges 112 and 114 extending therebetween. The tarpaulin 100 includes a tarpaulin mesh 116, made of a polymer or of a polymer with metallic wires woven therewith. The tarpaulin mesh 116 is reinforced with a peripheral reinforcement band 118 extending along the tarpaulin peripheral edge, and one or more lateral reinforcement bands 120 extending laterally thereacross at selected locations between the tarpaulin first and second end edges 108 and 110. The peripheral and lateral reinforcement bands 118 and 120 are secured to the tarpaulin mesh using stitches 122. The stitches 122 are represented as single lines in the drawings for clarity reason, but usually, each stitch line is embodied by group of tightly spaced parallel stitches, for example between 3 and 5 parallel stitches.

The peripheral and lateral reinforcement bands 118 and 120 are typically made of individual strips of polymer provided on one or both sides of the tarpaulin mesh 116. Also, the peripheral reinforcement band 118 may be made with elongated strips that are folded over themselves to cover both sides of the tarpaulin mesh 116. However, in alternative embodiments, the peripheral reinforcement band 118 or both the peripheral and lateral reinforcement bands 118 and 120 are made of a single piece of material. the peripheral and lateral reinforcement bands 118 and 120 may be for example made of PVC.

The reinforcement belt 104 is stitched along with one of the lateral reinforcement bands 120, superposed therewith. Typically the reinforcement belt 104 extends from one of the tarpaulin side edges 112 and 114 to the other. Additional reinforcement belts 104 may also be provided adjacent the tarpaulin first and second end edges 108 and 110. The reinforcement belts 104 may be provided on one or both sides of the tarpaulin 100.

As seen in FIG. 9, the replacement section 102 is configured for replacing part of the tarpaulin 100 and includes a replacement mesh 130 reinforced with a sewn replacement peripheral band 124 similar to the peripheral reinforcement band 118. In some embodiments, the replacement section 102 is also provided at opposed longitudinal ends thereof with a cinch 56, extending laterally, and straps 126, extending longitudinally. Reinforcement belts 104 are also provided in some embodiments of the invention, as in the tarpaulin 100. The straps 126 are usable to slide the replacement section 102 in place by pulling thereonto and to secure the replacement section 102 to the tarpaulin 100 when a repair is made.

The tarpaulin 100 and the replacement tarpaulin 102 are also provided with first and second mounts 26 and 28 for mounting to a tarpaulin handling system 18, similarly to the tarpaulin 10 and replacement section 38. For example, the first and second mounts that the form of open ended pockets extending along the whole length of the tarpaulin 100 and replacement section 102. As in the system described above, the replacement tarpaulin 102 is similar in construction to the section of the tarpaulin 100 that is to be replaced by the replacement tarpaulin 102.

In use, when a section of the tarpaulin 100 is damaged, a cut is performed laterally across the whole tarpaulin 100 to separate the damaged section thereof from the remainder of the tarpaulin 100. As for the tarpaulin 10, this process can be performed in some embodiments without removing the tarpaulin 10 from a tarpaulin handling system 18 to which it is mounted. The cut is performed along one of the reinforcement belts 104, either adjacent thereto, or in the reinforcement belt 104 itself. The cut is performed so that the reinforcement belt 104, or at least part thereof, remains still securely stitched to the portion of tarpaulin 100 that remains mounted, that is to the undamaged or remaining portion of the tarpaulin 100. The stitches 122 will then prevent the tarpaulin mesh 116 from fraying as they will stop any tear in the tarpaulin mesh 116 from propagating further.

Once the cut has been made, the damaged portion of the tarpaulin 100 is removed and the replacement tarpaulin 102 is slid on the tarpaulin handling system 18. The straps 126 are then secured to the reinforcement belt 104 at which the cut was performed. The straps 126 can be secured to the reinforcement belt 104 using rivets, nuts and bolts, or in any other suitable manner. Also, the replacement section 102 can be secured in alternative embodiments using any of the methods described hereinabove with respect to the replacement section 38. Typically, the tarpaulin 100 and the replacement section 102 overlap slightly each other such that air is not directed thereunder when a vehicle to which they are secured moves at high speed.

While the present document mainly refers to tarpaulins used in systems in which the tarpaulin is deployed and retracted laterally relative to the vehicle container, similar structures are usable also in other types of tarpaulin manipulating system. For example, such other tarpaulin manipulating systems include sliders to which the tarpaulin is mounted so that the tarpaulin is retracted and extended through a movement of the sliders longitudinally along the container. A non-limiting example of such a system is described U.S. Pat. No. 8,864,212 issued Oct. 21, 2014 to Cramaro, the contents of which is hereby incorporated by reference in its entirety. In such system, the tarpaulin and replacement section are secured to the tarpaulin handling system using structures that differ from the pocket and elongated member described herein, similar to known structures to secure tarpaulins that are known in the art.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A tarpaulin system for a vehicle, comprising:
    a main tarpaulin mountable to the vehicle, the main tarpaulin including first and second sections spaced apart from each other and a junction section extending therebetween, wherein the first and second sections include respectively first and second fibrous bodies, the first and second fibrous bodies being at least in part covered by or embedded in respectively first and second polymer layers, the main tarpaulin defining a tarpaulin peripheral edge including longitudinally opposed tarpaulin first and second end edges and laterally opposed tarpaulin side edges extending therebetween; and
    a replacement tarpaulin including a replacement section configured for replacing one of the first and second sections, the replacement section including a replacement fibrous body, the replacement fibrous body being at least in part covered by or embedded in a replacement polymer layer, the replacement tarpaulin also including an attachment section extending from the replacement section;
    wherein the junction section is cuttable to separate the first and second sections from each other while maintaining integrity of the first and second fibrous bodies so that the main tarpaulin is restored after the one of the first and second sections is removed and replaced by the replacement section with a remaining portion of the junction section and the attachment section joined to each other,
    further wherein
        the junction section includes a junction fibrous body, the first, second and junction fibrous bodies extend integrally as a single piece of material from each other, the junction fibrous body being secured to a junction woven reinforcement belt extending therealong between the tarpaulin side edges; and
        the attachment section includes attachment straps protruding from a remainder of the replacement tarpaulin; and
        the main tarpaulin is cuttable along the junction woven reinforcement belt to remove a damaged portion of the tarpaulin and replace the damaged section by the replacement section by securing the attachment straps and junction woven reinforcement belt to each other.

2. The tarpaulin system as defined in claim 1, wherein the attachment section includes an attachment fibrous body, the attachment and replacement fibrous bodies extending integrally as a single piece of material from each other.

3. The tarpaulin system as defined in claim 2, wherein the first and second polymer layers cover or embed substantially entirely the first and second fibrous bodies, the junction fibrous body being substantially entirely covered by or embedded in a junction polymer layer.

4. The tarpaulin system as defined in claim 3, wherein the first, second and junction polymer layers extend integrally from each other as a single piece of material.

5. The tarpaulin system as defined in claim 3, wherein the junction polymer layer is thicker than the first and second polymer layers.

6. The tarpaulin system as defined in claim 5, wherein the first and second polymer layers have substantially similar thicknesses, the junction polymer layer being at least twice as thick as the first and second polymer layers.

7. The tarpaulin system as defined in claim 3, wherein the first, second and junction fibrous bodies include at least one of a scrim, a woven material, a fabric or a mesh, nylon, polyester, a metallic material and a polymeric material and wherein the first, second and junction polymer layers are made of polyvinyl chloride (PVC).

8. The tarpaulin system as defined in claim 3, wherein the attachment fibrous body is substantially entirely covered by or embedded in an attachment polymer layer, the attachment and junction polymer layers having substantially similar thicknesses.

9. The tarpaulin system as defined in claim 1, wherein the first and second polymer layers include lateral reinforcement bands extending laterally across the tarpaulin, at least one of the lateral reinforcement bands extending in register with the junction woven reinforcement belt; and
    the replacement tarpaulin includes a replacement mesh reinforced with sewn polymer bands around a replacement peripheral edge thereof.

10. The tarpaulin system as defined in claim 9, wherein the first, second and junction fibrous bodies are made of a tarpaulin mesh.

11. The tarpaulin system as defined in claim 10, wherein the tarpaulin mesh is reinforced with sewn polymer bands around the tarpaulin peripheral edge.

12. The tarpaulin system as defined in claim 1, further comprising a mounting system for mounting the main tarpaulin to a tarpaulin handling system usable to deploy and retract the tarpaulin relative to the vehicle.

13. The tarpaulin system as defined in claim 12, wherein the mounting system includes an elongated member thicker than the main tarpaulin and an open-ended pocket each extending along a respective one of the tarpaulin side edges.

14. The tarpaulin system as defined in claim 12, wherein the replacement tarpaulin includes a replacement mounting system for mounting the replacement tarpaulin to the tarpaulin handling system.

15. The tarpaulin system as defined in claim 1, further comprising a cinch extending from the main tarpaulin adjacent to or at one of the tarpaulin first and second end edges for securing to the vehicle.

16. The tarpaulin system as defined in claim 1, further comprising protective pads made of a material softer than metal and mountable to the vehicle so that the protective pads are between the main tarpaulin and the vehicle when the tarpaulin is deployed to reduce wear of the main tarpaulin adjacent at least one of the tarpaulin first and second end edges when the main tarpaulin moves relative to the vehicle while the latter moves.

17. A method for repairing a main tarpaulin using a replacement tarpaulin, the main tarpaulin being mounted to a tarpaulin handling system usable to deploy and retract the main tarpaulin relative to a vehicle, the main tarpaulin including a fibrous core, the method comprising:
deploying the main tarpaulin using the tarpaulin handling system;
with the main tarpaulin remaining mounted to the tarpaulin handing system, cutting the main tarpaulin thereacross in a junction section provided between damaged and remaining sections of the main tarpaulin to separate the damaged and remaining sections from each other;
removing the damaged section from the tarpaulin handling system while keeping the remaining section mounted to the tarpaulin handling system;
mounting the replacement tarpaulin to the tarpaulin handling system and positioning the replacement tarpaulin adjacent to or overlapping with part of the remaining section; and
securing the replacement and remaining sections to each other.

18. The method as defined in claim 17, wherein the fibrous core is embedded in a polymer layer, the polymer layer being thicker in the junction section than in a remainder of the main tarpaulin.

19. The method as defined in claim 17, wherein the fibrous core is reinforced with polymer bands extending across the tarpaulin, the main tarpaulin further comprising a woven reinforcement belt extending along one of the polymer bands in the junction section.

20. The method as defined in claim 19, wherein cutting the main tarpaulin includes cutting the reinforcement belt.

21. The method as defined in claim 19, wherein cutting the main tarpaulin includes cutting the main tarpaulin adjacent the reinforcement belt.

22. The method as defined in claim 19, wherein the replacement tarpaulin is provided with attachment straps protruding therefrom, securing the replacement and remaining sections to each other including securing the attachment straps to the remaining section in the junction section.

23. The method as defined in claim 17, wherein securing the replacement and remaining sections to each other includes at least one of gluing, ultrasound welding, stitching, riveting or bolting the replacement and remaining sections to each other.

24. A repaired tarpaulin obtained from a main tarpaulin and a replacement tarpaulin by performing the method as defined in claim 17.

* * * * *